Dec. 29, 1925.  
J. HERMAN  
MIXER FOR OIL FLOTATION APPARATUS AND THE LIKE  
Filed April 12, 1923    2 Sheets-Sheet 2
1,567,501
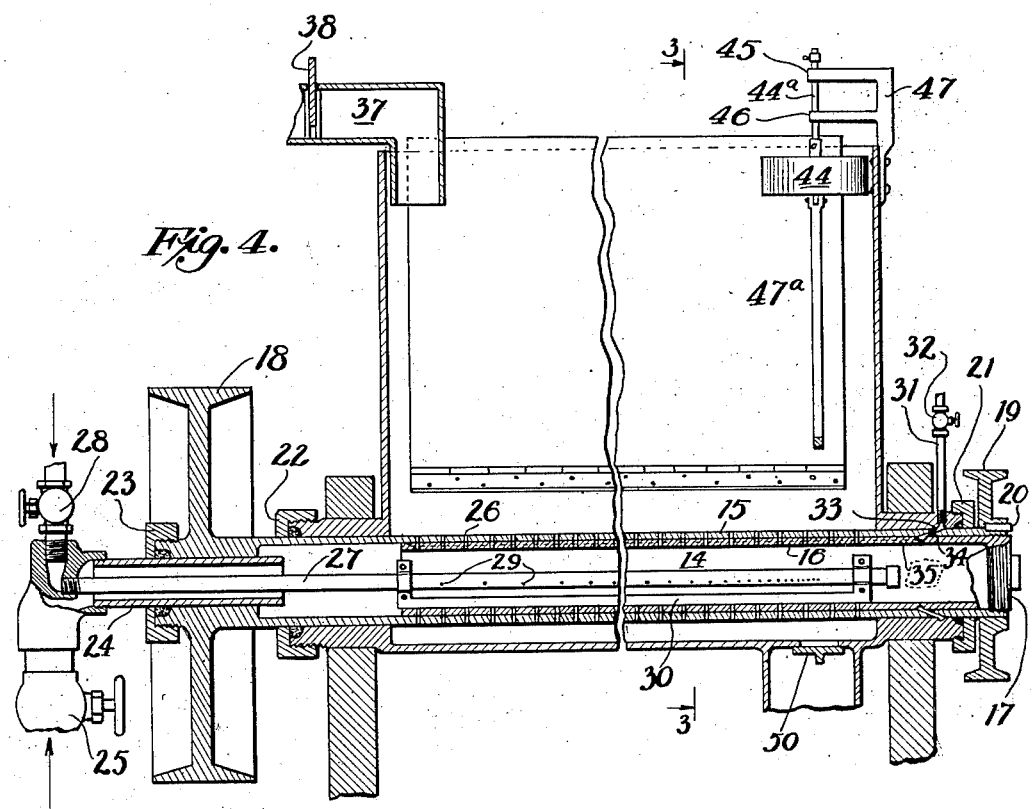
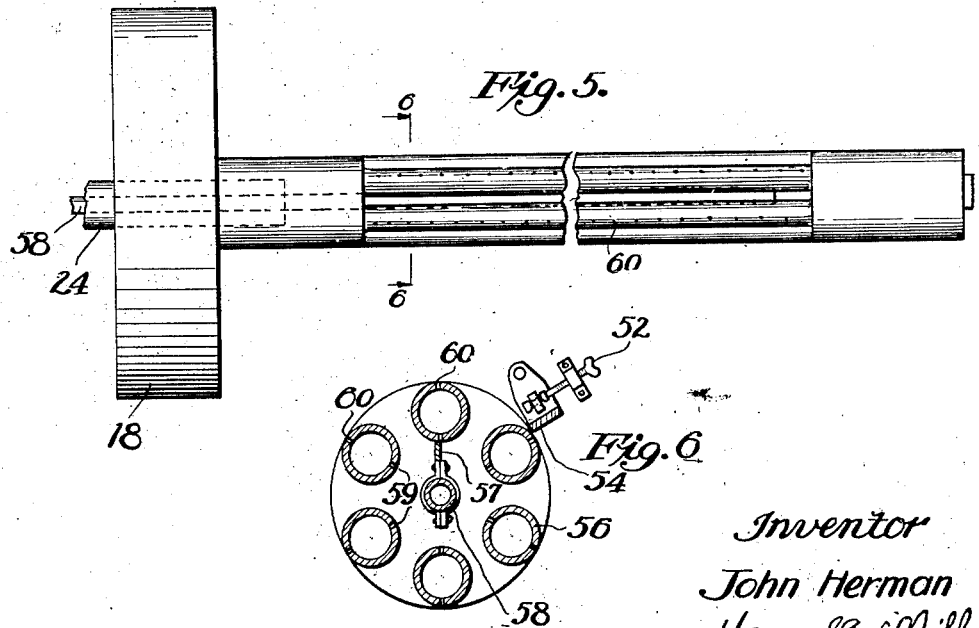
Inventor  
John Herman  
by Hazard and Miller  
Att'ys Patented Dec. 29, 1925.

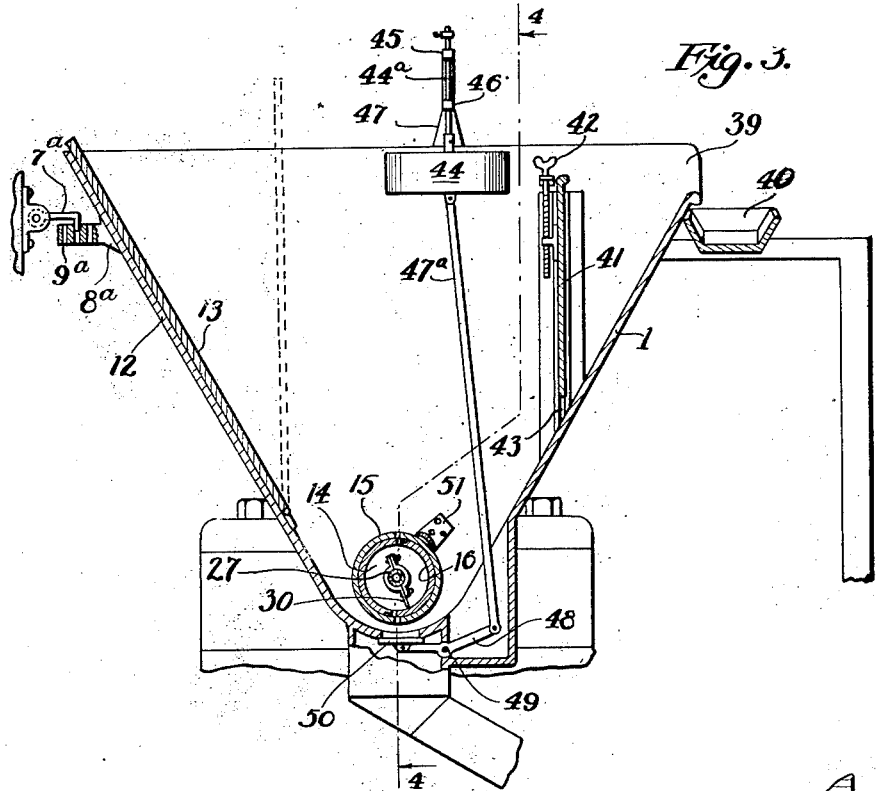
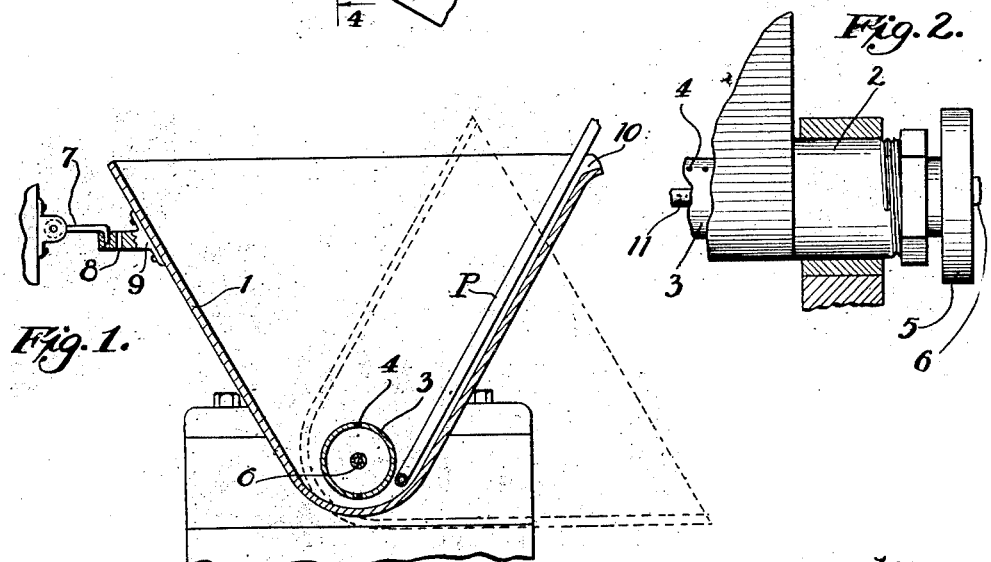

1,567,501

UNITED STATES PATENT OFFICE.

JOHN HERMAN, OF LOS ANGELES, CALIFORNIA.

MIXER FOR OIL-FLOTATION APPARATUS AND THE LIKE.

Application filed April 12, 1923. Serial No. 631,529.

*To all whom it may concern:*

Be it known that I, JOHN HERMAN, a citizen of the United States, residing at Los Angeles, in the county of Los Angeles and State of California, have invented new and useful Improvements in Mixers For Oil-Flotation Apparatus and the like, of which the following is a specification.

While my present invention may be referred to as a mixer for oil flotation apparatus and the like, it should be understood that the broad object of my invention comprises the use of novel and improved means and methods for introducing air or other gases, optionally in conjunction with oil, into liquids in an efficient, economical, convenient and reliable manner.

It being understood that there is an optimum size for bubbles to be used in the recovery of values from any specified ore and under any specific set of conditions, some bubbles being too large to operate effectively, and some bubbles being so small as to entrain considerable quantities of worthless material, it is a further object of this invention to provide means, preferably comprising relatively moving parts, for controllably producing air bubbles of a desired size within a body of liquid, and my preferred means is also effective in distributing such bubbles within the body of liquid and in agitating the latter, together with any solid material suspended therein.

It is a further object of my invention to obviate the use of canvas or equivalent material as a means for the production of bubbles; and I aim also to render unnecessary the use of high pressure in the production of flotation bubbles.
It is a further object of this invention to provide means whereby practically all of the air delivered into a body of liquid may be so subdivided as to produce bubbles or a froth of exactly that character which may be found most suitable to the treatment of a particular ore; and I aim to provide also a means and a method for delivering desired quantities of air and oil simultaneously into a body of liquid.
It is a further object of this invention to provide means whereby both the mentioned oil and the air may be effectively and controllably delivered in a desired ratio, and in my preferred embodiment I provide means for treating a uniform stream of suitably pulverized ore, means being optionally included for controlling the agitating effect of my air and oil feeding devices.

It is a further object of my invention to provide, preferably in conjunction with the features above referred to, automatic and manually adjustable means for maintaining a desired depth of liquid within a flotation tank; and the means referred to may comprise also automatic means for controlling the withdrawal of tailings.

In one preferred embodiment of my invention, I may provide internal pivoted means for controlling the active volume of a suspension undergoing treatment, my preferred means being such that the agitating effect may be varied independently of the depth of the liquid agitated; and I may optionally provide, in connection with my flotation chamber, a "purgatory" compartment, for optional use in the study of results attained, or for the separate collection of a fraction whose destiny may be uncertain, or for other purposes.

Other objects of my invention will appear from the following description of preferred and alternative embodiments thereof, and from the appended claims, taken in connection with the accompanying drawings, in which—

Figure 1 is a vertical section of a simple type of apparatus embodying my invention, this form comprising a tiltable V-shaped receptacle suitable for laboratory or small-scale operations.

Fig. 2 is a detail view showing how the receptacle disclosed in Fig. 1 may be pivotally supported and provided with means for rotating an air feed tube.

Fig. 3 is a vertical transverse section of a flotation apparatus embodying one preferred form of my invention, this view being taken substantially on the line 3—3 of Fig. 4.

Fig. 4 is a vertical longitudinal section, which may be regarded as taken on the line 4—4 of Fig. 3.

Fig. 5 is a detail view showing an alternative form of air feed tube and parts associated therewith.

Fig. 6 is a diagrammatic section which may be regarded as taken on the line 6—6 of Fig. 5.

In that comparatively simple form of apparatus for use in the practice of my invention which is disclosed in Figs. 1 and 2,

1 is a receptacle, shown as substantially V-shaped in cross section, and as mounted upon hollow trunnions 2, through one of which may extend a hollow element 3 provided with apertures 4, and adapted to be rotated by means such as the pulley 5, any suitable means, such as the fixed pipe 6, being provided for the introduction of air into the rotating hollow element 3. The mentioned hollow element is preferably placed near the bottom of the V-shaped trough 1, it being intended that this element shall serve not only as a means for the introduction of air and the production of bubbles of a predetermined size therefrom, but also for the agitation of an ore suspended and confined within said trough and containing values which are to be separated by flotation. In order to dispense with the necessity for an outlet at the bottom of a receptacle of this sort, this form of my apparatus being intended for laboratory or small-scale operations, I render the receptacle tiltable by supporting the same pivotally, in the manner described; and I find it advantageous to provide also means such as the latch 7, engaging alternatively any one of a series of openings 8 in the bracket 9 secured to said receptacle, for varying the angle of inclination thereof. In this manner, pulverized ore being introduced into the receptacle by any suitable means not shown, a suitable overflow of concentrates through the spout 10 may be effected as desired. Optionally I may introduce through the apertures 4 not only air or another gas or mixture of gases but also oil; and when it is desired I may employ an additional inner perforated tube 11, which may be relatively fixed, and may be introduced through a trunnion opposite to that shown in Fig. 2, this tube being connected with any suitable and controllable supply of a flotation oil, or through an outside pipe P.

It being understood that the revolving air feed pipe 4 constitutes not only an agitating means but a means for the production and distribution of bubbles of a preferred size, it should be noted that, with a given pressure of air, the size of the bubbles produced is dependent largely upon the rate of rotation of this delivery tube. Bubbles may begin forming when the apertures are in any relative position, but they tend to leave the distributing tube when a set of apertures is in the position of the apertures 4 in Fig. 1; and it will accordingly be obvious that, other conditions of operation being the same, the fineness of the bubbles produced is increased by rapidity of rotation.

Although the apparatus shown in Figs. 1 and 2 is entirely suitable for the purposes indicated, I prefer, for larger scale operations, an apparatus of the general character indicated in subsequent figures.

In Figs. 3 and 4, I show a type of receptacle 12 which may be substantially ten feet in height; and this receptacle is shown as provided with a pivoted plate 13, by which I am enabled to control the agitating effect of the bubble distributor 14, which is arranged near the bottom of this receptacle. By moving the plate 13 into the position shown in dotted lines, it will be obvious that I may vary the effective volume of my receptacle, and thereby increase the effectiveness of my bubble producing element as an agitating device.

In the form of apparatus here referred to, I may employ any preferred type of bubble producing means, but I find it advantageous to employ a distributor of the character shown, in which 15 is a revolving air feed pipe in the form of an outer sleeve. This outer sleeve I prefer to provide with means for varying the effective size of its apertures, and the means last referred to may take the form of an inner sleeve 16 provided with corresponding apertures, but adapted to be moved relatively to the outer sleeve 15, and it may be integral with a plug 17, thereby closing the end of the air delivery.

In order to provide for rotating the air delivery or bubble distributor 14, this element serving also as a means of agitation, I may employ any preferred form of drive adapted to permit desired variations in speed of rotation; and for this purpose I have suggested the securing of pulleys 18 and 19 to opposite ends of the outer sleeve 15, one of these pulleys being shown as integral with the mentioned sleeve, and the other as secured thereto by means such as a key 20, suitable glands being provided at 21, 22 and 23, and a fixed pipe 24 provided with a valve 25, being employed for the introduction of air at a suitable rate and under a suitable pressure.

Flotation oils may be introduced in any preferred manner, but I find it advantageous to so introduce these oils that they may be fed through the bubble forming apertures 26, in the sleeve 15. For this purpose I may employ a pipe 27, shown as provided with a valve 28, and as extending horizontally through the air feed pipe 24. In order to produce a uniform feed of oil, I may optionally space the outlet apertures 29 from the oil feed pipe 27, in the unequal manner suggested in Fig. 4; and I may also secure to the pipe 27 a fixed baffle or doctor blade 30, this blade preferably making a light contact with the moving surface of the inner sleeve 16.

In order suitably to distribute the flotation oil, and in order to secure an effective lubrication between the cooperating surfaces of the sleeves 15 and 16, I may optionally provide an additonal means for introducing oil in a predetermined ratio, this additional means preferably comprising a feed pipe 31, provided with a valve 32, and connected with an annular channel 33 in the outer surface of the sleeve 15, this channel being shown as connected by means such as the inclined ducts 34, with distributing channels 35, which may extend longitudinally of the outer surface of the inner sleeve, and adjacent the openings 36 therethrough. By the means described, oil may be fed into the bubble producing and agitating device 14 from either end thereof, and may be reliably delivered in regulable quantities in such manner as to aid in the formation of a comparatively permanent froth of bubbles of a predetermined size.

It being understood that finely subdivided ore may be fed at a desired rate, and preferably as a suspension through the inlet 37, provided with a gate or valve 38, and permitted to overflow through the spout 39 into a concentrate trough 40, supported in any suitable way adjacent said spout, I prefer to provide in the vicinity of this spout or outlet a movable plate 41, optionally provided with an adjusting screw 42, this plate being adapted to define what I have referred to as a "purgatory" or region of quiet adjacent said outlet.

This region of quiet may serve to permit entrained particles of worthless material to settle and to be returned to the tailings through an adjustable opening 43; or, when desired, the mentioned opening 43 being closed, it may be employed for the collection of a sample, which obviously should ordinarily be found to contain no economically recoverable values.

To effect a slight change in the depth of liquid undergoing treatment, or for any other purpose desired, variable securing means comprising the elements 7ª, 8ª and 9ª, similar in form to the elements 7, 8 and 9 described in connection with Fig. 1, or of any other preferred design, may optionally be employed, due allowance being made for the great weight of the large receptacle here referred to and its contents; and any preferred means may be employed to control the outflow of tailings and water through the valved bottom opening 43, this control means being preferably such as to permit the maintenance of a constant or desired level while avoiding an undue outflow of liquid with the concentrates delivered through the spout 39.

For the purpose last mentioned, I prefer to employ automatic means which shall facilitate the elimination, after a suspension shall have been duly agitated, of the heavy and worthless residue which tends to accumulate in the bottom of the receptacle. In one embodiment of my invention, I may employ, to this end, a float 44, shown as adjustably secured to a vertical rod 44ª, which is movable relatively to guide arms 45, 46, carried by a bracket 47, the mentioned rod 44ª being connected, as by means of a pivoted rod 47ª, with one arm of a lever 48, shown as pivoted at 49, and as movably secured to a valve plate 50.

Although a suitable agitation of a suspension containing the values may be effected by the rotation of a perforated cylindrical element such as the bubble distributor 14, and by the ascent of bubbles delivered therefrom, there are advantages in the employment of an internal doctor blade, such as is shown at 51, in Fig. 3, a second form of external doctor blade, optionally provided with adjusting means 52, being illustrated at 54, Fig. 6. An external doctor blade, whatever its configuration, may serve not only as a fixed baffle but as a means for scraping off or hastening the separation of bubbles before they become expanded to an undue size, or at a point which is favorable to a desired flotation effect in the recovery of values.

In Figs. 5 and 6, I have illustrated diagrammatically an alternative form of means for producing bubbles of a predetermined size, this form of bubble distributor being formed of a number of substantially parallel perforated pipes by the rotation of which superior agitating effects may be obtained; and in connection with this form of my device I have suggested the employment of an inner fixed doctor blade 57, shown as secured to an oil delivery pipe 58 and as adapted to expedite the separation of bubbles formed by air escaping through the openings 59, these being additional to the openings 60, with which the mentioned doctor blade 54 may cooperate.

It is believed that various practicable modes of operation of my invention will be readily understood from the foregoing description, and it will be obvious that although I may produce variations in agitating effects by merely changing the rate of air feed, I may also produce such variations by changing the rate of rotation of the revolving delivery, or by changing the effective volume of my receptacle; and also that the size of the air bubbles produced may depend not only upon the rate of rotation but also upon the rate of air feed, or upon the air pressure, or upon the depth of submergence, or upon the effective size of the apertures through which the air is delivered, or upon the relative position of doctor blades, or even upon the rate and manner in which the oil is fed therewith. By a suitable concurrent adjustment of any of the mentioned factors, widely different results may be obtained at will and in accordance with the requirements of a material or problem in hand.

By the adjustments above referred to, and by suitably controlling the density of a suspension treated, and the rate of ore admission through the feed pipe, and the position of the pivoted plate 13, and the level of the float 44, and the facility of egress from the described "purgatory" or region of quiet, and even by the inclination of the entire receptacle, I may adapt my apparatus to a very wide variety of uses in the treatment of diverse material under different conditions and for various results.

Although I have described above a complete apparatus and various modifications thereof, it will be understood that various features of my invention may be independently employed, and that various modifications may be made without departure from the spirit and scope of my invention as the same is indicated above and in the following claims.

What I claim is:

1. An apparatus for the treatment of ores by flotation comprising a basin, an apertured pipe adapted to be axially rotated within said basin means for admitting a fluid to said pipe so as to be discharged into the basin through the apertures therein, and a blade adapted to engage the exterior surface of said apertured pipe.

2. An apparatus for the treatment of ores by flotation comprising a basin, an apertured pipe adapted to be axially rotated within said basin means for admitting a fluid to said pipe so as to be discharged into the basin through the apertures therein, and a blade adapted to engage the exterior surface of said apertured pipe, and means for varying the effective volume of said basin.

3. An apparatus for the treatment of ores by flotation comprising a basin, an apertured pipe adapted to be axially rotated within said basin means for admitting a fluid to said pipe so as to be discharged into the basin through the apertures therein, and a blade adapted to engage the interior of said apertured pipe.

4. An apparatus for the treatment of ores by flotation comprising a basin, an apertured pipe movable within the basin, means for moving said pipe, means for causing a fluid to be discharged through the apertures in said pipe into the basin, and a blade adapted to engage said pipe as and for the purpose described.

5. An apparatus for the treatment of ores by flotation comprising a basin, an apertured pipe adapted to be rotated within said basin means for admitting a fluid to said pipe so as to be discharged into the basin through the apertures therein, and an adjustable blade adapted to engage the exterior surface of said apertured pipe.

6. An apparatus for the treatment of ores by flotation comprising a basin, an apertured pipe axially rotatable within said basin means for admitting a fluid to said pipe so as to be discharged into the basin through the apertures therein, means for varying the sizes of the apertures comprising a second apertured pipe disposed within the first mentioned pipe, and means for bringing the apertures of the second mentioned pipe into or out of register with the apertures of the first mentioned pipe.

7. An apparatus for the treatment of ores by flotation comprising a basin, an apertured pipe axially rotatable within said basin, means for varying the sizes of the apertures comprising a second apertured pipe disposed within the first mentioned pipe, means for bringing the apertures of the second mentioned pipe into or out of register with the apertures of the first mentioned pipe, and means for admitting oil between said pipes.

8. An apparatus for the treatment of ores by flotation comprising a basin, an apertured pipe axially rotatable within said basin, means for varying the sizes of the apertures of said pipe, and means for admitting oil to the interior of said pipe comprising a fixed apertured pipe disposed within the first mentioned pipe, and a blade carried by said fixed apertured pipe adapted to engage the interior surface of the first mentioned pipe.

9. An apparatus for the treatment of pulverized ores by flotation comprising a basin, a pipe rotatably mounted within said basin, said pipe having a plurality of apertures, means for admitting air into the interior of said pipe and means for varying the effective volume of said basin comprising a hinged plate mounted within said basin.

10. An apparatus for the treatment of pulverized ores comprising a basin, an apertured pipe extending across the bottom of said basin means for admitting a fluid to said pipe so as to be discharged into the basin through the apertures therein, means for axially rotating said apertured pipe and a blade secured to said basin and adapted to engage the exterior surface of said apertured pipe.

11. An apparatus for the treatment of pulverized ores by flotation comprising a basin, an apertured pipe extending across the bottom of said basin and rotatably mounted therein, means for admitting oil within said pipe comprising a second apertured pipe extending within the first mentioned pipe and a blade carried by said second pipe.

12. An apparatus for the treatment of pulverized ores comprising a basin pivotally supported by means of hollow trunnions, an apertured pipe extending through one of said trunnions into said basin, means for admitting air to said pipe and means for permitting rotation of said pipe within said trunnion.

13. An apparatus for the treatment of pulverized ores comprising a basin pivotally supported by means of hollow trunnions, an apertured pipe extending through one of said trunnions into said basin, means for admitting air to said pipe and means for permitting rotation of said pipe within said trunnion, and means for admitting oil within said pipe comprising a second apertured pipe extending into the first mentioned pipe.

14. An apparatus for the treatment of pulverized ores comprising a basin pivotally supported by means of hollow trunnions, an apertured pipe extending through one of said trunnions into said basin, means for admitting air to said pipe and means for permitting rotation of said pipe within said trunnion, and means for varying the sizes of the apertures of said pipe comprising a second apertured pipe within the first mentioned pipe engaging the interior thereof, and means for holding the second pipe in a predetermined position.

15. In apparatus for the treatment of ores by flotation comprising a basin tiltably mounted upon hollow trunnions, an apertured pipe extending into said basin through one of said trunnions, a second apertured pipe extending into the first mentioned pipe, means permitting rotation of the first mentioned pipe and a blade adjustably secured within said basin adapted to engage the exterior surface of the first mentioned pipe.

16. An apparatus for the treatment of ores by flotation comprising a tiltable basin mounted upon hollow trunnions, an apertured pipe extending into said basin through said hollow trunnions, means permitting rotation of said apertured pipe, means for admitting oil within said apertured pipe comprising a fixed apertured pipe extending within the first mentioned pipe, a blade carried by said fixed apertured pipe and adapted to engage the interior surface of the first mentioned apertured pipe.

17. An apparatus for the treatment of ores by flotation comprising a tiltable basin mounted upon hollow trunnions, an apertured pipe extending into said basin through said hollow trunnions, means permitting rotation of said apertured pipe, means for admitting oil within said apertured pipe comprising a fixed apertured pipe extending within the first mentioned pipe, a blade carried by said fixed apertured pipe and adapted to engage the interior surface of the first mentioned apertured pipe, and a movable plate disposed within said basin, adapted to define a compartment therein of relatively quiet action.

In testimony whereof I have signed my name to this specification.

JOHN HERMAN.